United States Patent [19]

Delevallee et al.

[11] Patent Number: 4,751,039
[45] Date of Patent: Jun. 14, 1988

[54] METHOD OF INSTALLING A SLEEVE WITHIN AN INSTRUMENTATION TUBE OF A NUCLEAR FUEL ASSEMBLY

[75] Inventors: Alain Delevallee, Ecully; Francis Lagarrigue, Sainte Foy les Lyon, both of France

[73] Assignee: Framatome, Courbevoie, France

[21] Appl. No.: 41,034

[22] Filed: Apr. 22, 1987

[30] Foreign Application Priority Data

Apr. 22, 1986 [FR] France ................... 86 05796

[51] Int. Cl.$^4$ ............................................ G21C 17/10
[52] U.S. Cl. ..................... 376/261; 376/254; 376/352; 376/446; 29/400 N; 29/401.1; 29/523
[58] Field of Search ............... 376/261, 260, 245, 254, 376/255, 352, 353, 446, 449; 29/400 N, 401.1, 402.06, 426.4, 523, 157.3 R; 72/367

[56] References Cited

U.S. PATENT DOCUMENTS

| | | | |
|---|---|---|---|
| 4,614,636 | 9/1986 | Walters | 376/352 |
| 4,617,171 | 10/1986 | Feutrel | 376/446 |
| 4,641,409 | 2/1987 | Shallenberger et al. | 29/401.1 |
| 4,663,119 | 5/1987 | Kerrey | 29/723 |
| 4,684,498 | 8/1987 | Paul | 376/353 |

FOREIGN PATENT DOCUMENTS 2592517  7/1987  France ................... 376/245

8101908  7/1981  World Int. Prop. O. ......... 376/352

*Primary Examiner*—Deborah L. Kyle
*Assistant Examiner*—Daniel Wasil
*Attorney, Agent, or Firm*—Pollock, Vande Sande & Priddy

[57] ABSTRACT

A spacer sleeve is installed within an instrumentation tube of a nuclear fuel assembly comprising two end nozzles connected by tie rods and a plurality of fuel rod supporting grids distributed at axial intervals along the tie rods. The instrumentation tube has a first end received in an initially blind bore formed in one of the end nozzles and communicating with the outside by a coolant restriction. An opening having a diameter equal to that of said sleeve and connected to the bore by a shoulder is machined in the end nozzles; a sleeve is inserted into the instrumentation tube through the opening; the sleeve is centered within said instrumentation tube by locally expanding it into contact with the instrumentation tube at a plurality of locations each in one of said intervals; a cap is introduced into the sleeve having a radial end collar dimensioned for abutting connection against said sleeve, a deformable lateral skirt and a bottom wall formed with a coolant flow orifice of predetermined cross-sectional area; and the sleeve is secured within the nozzle by simultaneously expanding radially the skirt and the sleeve against the shoulder.

7 Claims, 3 Drawing Sheets

METHOD OF INSTALLING A SLEEVE WITHIN AN INSTRUMENTATION TUBE OF A NUCLEAR FUEL ASSEMBLY

BACKGROUND OF THE INVENTION

1. Technical Field

The invention relates generally to nuclear fuel assemblies of the type having two end pieces or end nozzles joined together by tie rods along which are spaced apart grids for holding fuel rods in position and having an instrumentation tube one end of which is secured into a blind bore formed in one of said nozzles.

Assemblies of the above type are used in pressurized water reactors. An instrumentation tube, placed along the vertical axis of the fuel assembly, is adapted to receive a flexible tube, called a "glove finger", movable through the bottom of the reactor vessel so as to be inserted into the core during operation of the reactor and withdrawn from the core during fuel reloading. When a "glove finger" is in the core, a measuring probe may be inserted into the core and removed therefrom by a flexible line remotely controlled by an electromechanical assembly situated outside the reactor vessel.

2. Prior Art

In a typical fuel assembly, one of the ends of the instrumentation tube opens through a coolant flow restriction intended to limit the flow rate which circulates in the space between the "glove finger" and the instrumentation tube. Different considerations lead to giving the instrumentation tube an internal diameter considerably greater than the external diameter of the "glove finger" which is engaged therein. The resulting gap and the lack of guidance in the spaces between the different internal components of the reactor, cause vibrations of the "glove finger" subjected to the coolant flow along the instrumentation tube, possibly to transverse coolant streams and to the vibrations of the internal parts which support the guide elements.

In the power reactors now in service, the high coolant speed causes sufficiently intense vibrations to cause wear of the "glove fingers" and instrumentation tubes. Now, a breakage in the instrumentation tube may cause transverse coolant jets to appear toward the adjacent fuel rods in the fuel assembly.

SUMMARY OF THE INVENTION

It is an object of the invention to provide a method of installing a spacing sleeve as a liner in an instrumentation tube of a fuel assembly, for reducing the radial gap and consequently the amplitude of possible vibrations, which method may be used without dismantling an existing assembly and without appreciably increasing neutron absorption by the structure of the assembly.

To this end, there is provided a method comprising the steps of:

(a) providing a sleeve having a diameter smaller than an inner diameter of said instrument tube, (b) machining, in one of said end nozzles, an opening having a diameter substantially equal to that of said sleeve and connected to said bore by a shoulder;

(c) inserting said sleeve into said instrumentation tube through said opening;

(d) centering said sleeve within said instrumentation tube by locally expanding said sleeve into contact with said instrumentation tube at a plurality of locations each between respective ones of the grids;

(e) introducing a cap into said sleeve, said cap having a lateral flange dimensioned for abutting connection against said sleeve, a deformable lateral skirt and a bottom wall formed with a coolant flow orifice of predetermined flow cross-sectional area; and (f) securing said sleeve within said one of said nozzles by simultaneously expanding radially said skirt and said sleeve against said shoulder.

The sleeve reduces the lost motion for the "glove finger"; the presence of the cap further limits the coolant flow around the "glove finger" to an appropriate value; leaks directed toward the fuel rods are prevented. However, the instrumentation tube may freely expand or contract axially with respect to the skeleton of the assembly, because no additional connection thereof with the end pieces is required.

There is also provided an assembly of the above-defined type wherein a sleeve, which may be of low thickness as compared to its diameter, having an external diameter less than the internal diameter of the instrumentation tube, is contained in the instrumentation tube and in the two end nozzles and is centered in the instrumentation tube by expansions formed locally in axial intervals between the grids and a cap inserted in one end of the sleeve has a collar bearing on the respective nozzle, a thin deformable skirt and a bottom wall formed with a calibrated coolant passage, the sleeve and the cap being permanently secured to the nozzle by radial expansion of their walls into contact with a shoulder of the bore in the nozzle.

The local expansions are advantageously formed diagonally between the rods adjacent the instrumentation tube, at 45° from these rods in the frequent case of an assembly in which the rods are distributed in a square lattice. The sleeve advantageously includes an end collar having a small amount of radial projection which bears against a furstoconical chamfer of the opening in the end nozzle. The lining sleeve may then be attached sufficiently to the nozzle to avoid relative movements, before it is finally secured by the cap, through local expansion of limited depth of the sleeve against the shoulder. Final connection is provided by the cap, which typically has a radial bearing collar arranged to contact a shoulder of the end nozzle surrounding the bore and whose expansion forcibly applies the collar onto the shoulder.

The invention will be better understood from the following description of a particular embodiment of the invention, given by way of example.

SHORT DESCRIPTION OF THE DRAWINGS

DESCRIPTION OF A PREFERRED EMBODIMENT

Figure 1:
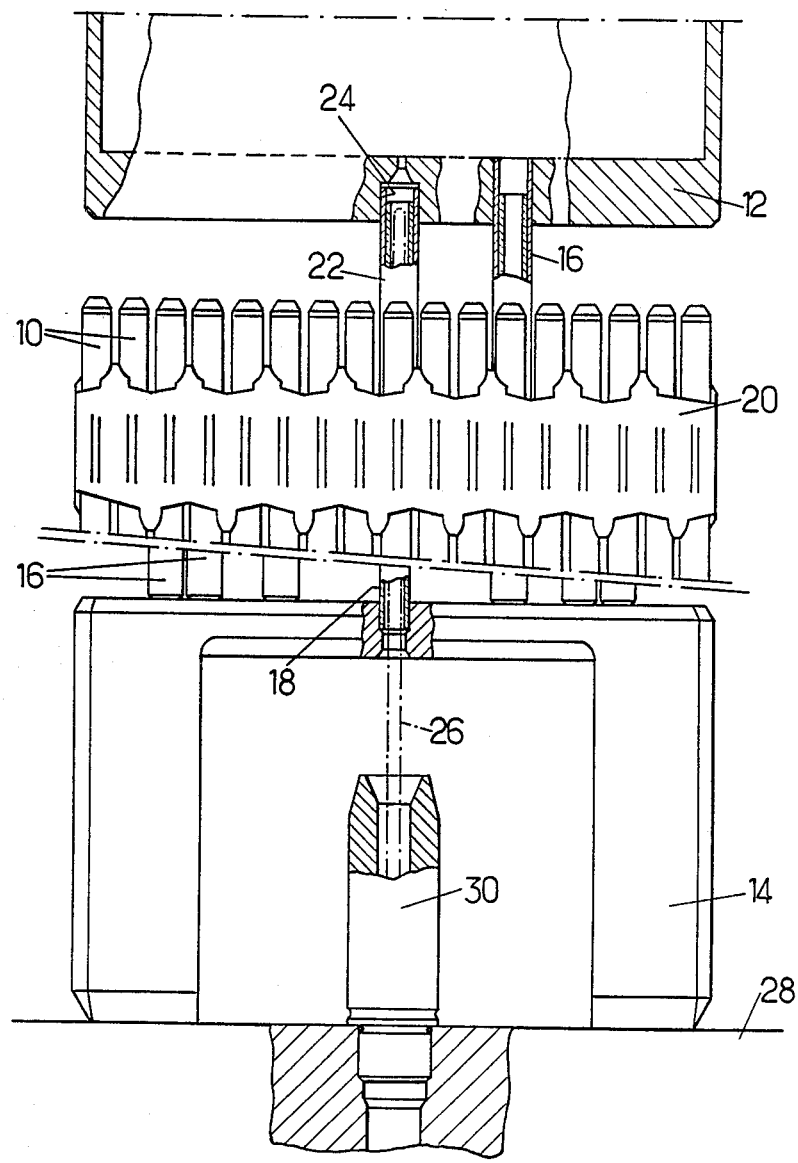
FIG. 1 is an elevational view in partial cross-section showing the end parts of a fuel assembly having an axial instrumentation tube.

Referring to FIG. 1, a fuel assembly has a bundle of fuel rods 10 and a skeleton for holding the rods in position. The skeleton includes an upper end nozzle or end part 12 (a fraction only of which is shown), a lower end nozzle 14, tie rods 16 joining the end nozzles 12 and 14 together, and a central instrumentation tube 18. Grids 20 fixed to the tie rods 16, and which may be spaced apart along the rod bundle 10, hold the fuel rods in a regular lattice.

The instrumentation tube 18 is mounted so as to be free to expand or contract axially with respect to the skeleton. For that, tube 18 is slidably engaged at its lower end in a bore of the nozzle 14. It is fixed at its upper part to the nozzle 12 by a sleeve 22 welded to the nozzle 12. The instrumentation tube 18 may be fixed to sleeve or thimble 22 by internal expansion (not shown) deforming the walls into each other.

The top end of sleeve 22 is engaged in a blind bore 24 of an adaptor plate of nozzle 12. The bottom of the bore is formed with a hole forming a restriction in the path of the coolant which flows along tube 18. The diameter of the hole is selected to limit the flow rate to an acceptable value.

During operation of the reactor, the instrumentation tube 18 contains a "glove finger" 26, shown by dash dot lines in FIG. 1, guided through the lower core plate 28 by a bush 30. The "glove finger" has a diameter considerably less than the internal diameter of the instrumentation tube 18. Due to the radial clearance and to the lack of mechanical connection between sleeve 30 and tube 18, vibrations are prone to occur under the action of the coolant stream which flows through the core and tube 18.

In a typical assembly, the internal diameter of the instrumentation tube 18 is 11.43 mm, whereas the external diameter of the "glove finger" is 7.5 mm, which gives the "glove finger" a considerable extent of movement and results in the risk of damaging the instrumentation tube, which generally is made of zirconium base alloy so as to reduce its neutron absorption.

Figure 2:
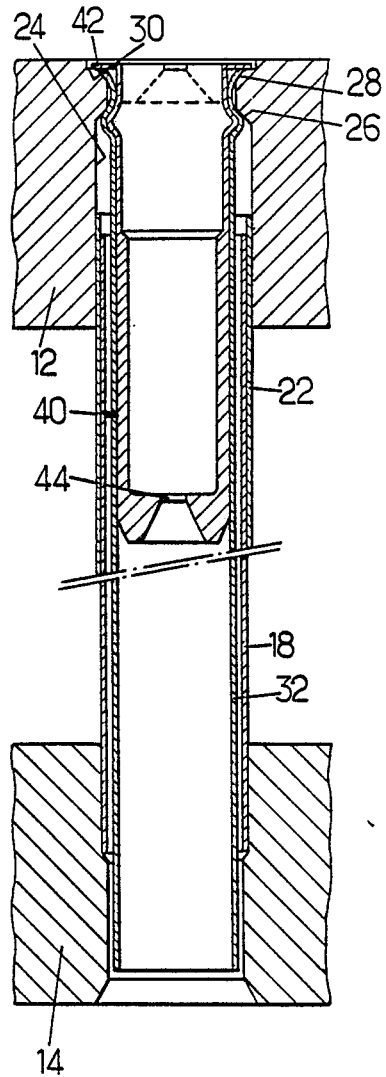
FIG. 2 is a sectional view along the axis of the instrumentation tube showing the ends thereof and modifications according to the invention.
Figure 3:
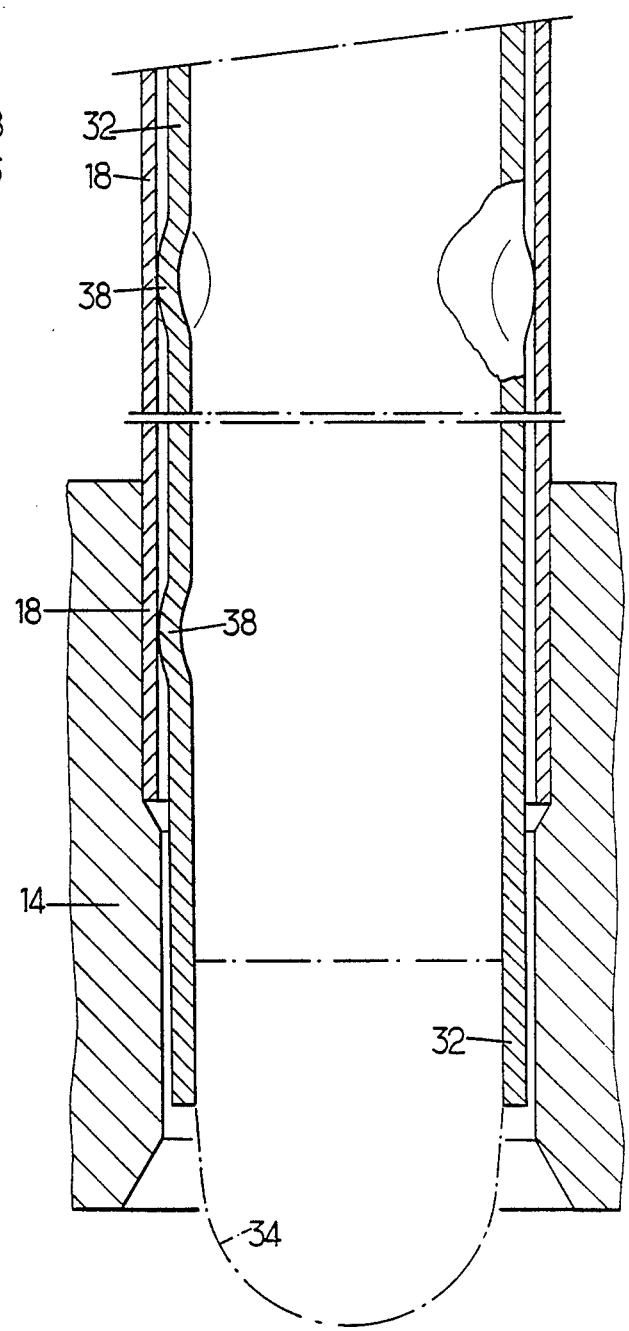
FIG. 3 is a detail view on an enlarged scale of centering bosses formed by local expansions of the sleeve of FIG. 2 for centering the sleeve, and FIG. 4, similar to FIG. 3, shows the connection of the lining sleeve with the upper nozzle of the assembly.
Figure 4:
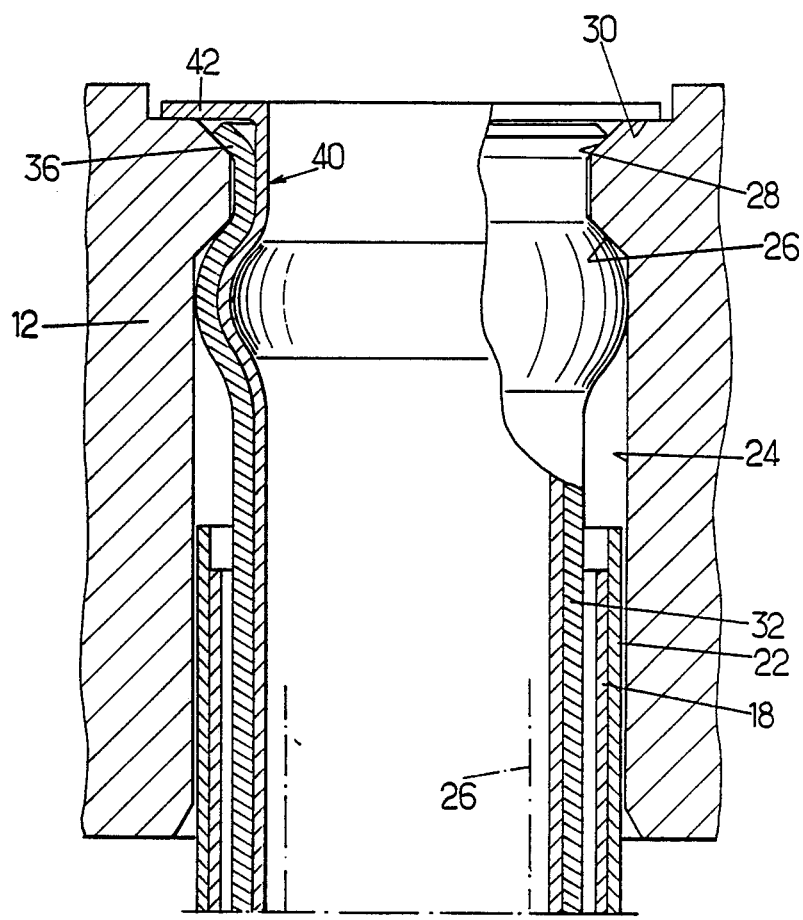

Referring to FIGS. 2 to 4, a method will now be described for lining the instrumentation tube with a sleeve so as to reduce the amplitude of the vibrations of the "glove finger" and to overcome the risk of leaks causing transverse jets onto the rods, without appreciably increasing neutron absorption.

For that purpose, an additional sleeve, of small thickness, of low neutron absorption material, is centered in the instrumentation tube. The sleeve constitutes a radial spacer. Its external diameter may be substantially smaller than the internal diameter of the instrumentation tube if means are provided for centering it therein: as shown, the centering means are in the nature of local spaced apart radially directed deformations of the spacing sleeve which has a constant thickness. The deformations constitute expansions which can be formed with spreader jaws of a pair of grippers. The different operations may be carried out in a pool, for example in an installation of the kind described in French No. 83 16145.

The successive operations for locating a spacing sleeve will now be described.

As a first step, the adapter plate of the upper end nozzle 12 is machined so as to remove the bottom of bore 24. The shape is changed from that shown with broken lines in FIG. 2 to the shape shown with a continuous line. This operation may be carried out using a milling tool guided by a mask temporarily positioned on the upper end nozzle. The resulting hole has a diameter corresponding to that of the lining sleeve and is connected to the bore 24 by a shoulder 26 and to the end face of the adapter plate of end nozzle 12 by a frustoconical chamfer 28 and a step 30. In the above-mentioned examples of an instrumentation tube having an internal diameter of 11.43 mm, a lining sleeve 32 of zirconium-base alloy may have an internal diameter of 9.48 mm and a thickness of 0.62 mm.

The lining sleeve 32 is then inserted into the instrumentation tube 18 through the hole formed in the adapter plate of an end nozzle 12. For easier insertion of the sleeve with a remote controlled gripper, a nose cone 34 (FIG. 3) may be temporarily placed at the lower end of the sleeve 32. A collar 36, having a slant corresponding to that of chamfer 28, is formed on sleeve 32 for bearing on the chamfer and thus determining the axial position of sleeve 32. Then sleeve 32 is radially bulged so as to give it a low amplitude pre-expansion under shoulder 26, so as to hold sleeve 32 in position during the steps preceding final connection. Radial expansion may be carried out using a spreading tool with four expandable jaws. Using another spreader, localized expansions are then formed for centering the lining sleeve 32 in the instrumenation tube 18. The expansions 38 (FIG. 3) are formed under such conditions as not to deform the instrumentation tube 18. They are located substantially in the middle of the space between two successive grids, the expansions between two grids being radially aligned in a direction at 45° from the fuel rods adjacent the sleeve. Using the same spreader, an annular bulge may be formed, or two sets of localized centering expansions at 45° from each other. As illustrated in FIG. 3, an expansion 38 has been shown. This expansion may project by 0.3 mm if the sleeve has the above-mentioned size. Once the expansions are carried out, the nose cone 34 is forced out with the expansion spreader and the spreader is withdrawn.

Finally, a cap 40 is positioned for permanently interlocking the lining sleeve 32 and end nozzle 12. The cap also operates as a choke limiting the flow rate along the lining sleeve. Cap 40 includes a deformable skirt ending in a radial collar 42 arranged for bearing on step 30. The end of the skirt opposite the collar is closed by a bottom wall formed with a calibrated coolant orifice 44 (FIG. 2).

Cap 40 is inserted until its collar 42 abuts step 30. Then, a tool for radial expansion is inserted, located at the horizontal level of the temporary securing expansion of the lining sleeve 32 and actuated to achieve complete locking. The expansions, which have a depth of about 0.70 mm, lock the cap 40 on sleeve 32 and the latter against shoulder 26. Since the cap does not project down out of the upper end nozzle, it may be of a material having high mechanical characteristics so as to avoid any risk of separation of sleeve 32 and end nozzle 12. It may for instance be of stainless steel.

I claim:

1. A method of installing a spacer sleeve within an instrumentation tube of a nuclear fuel assembly comprising two end nozzles connected by tie rods and a plurality of fuel rod supporting grids distributed at axial intervals along the tie rods, the instrumentation tube having a first end received in a blind bore formed in one of the end nozzles and communicating with the outside by a coolant flow throttling passage, comprising the steps of:

(a) providing a sleeve having a diameter smaller than an inner diameter of the instrumentation tube, (b) machining an opening having a diameter substantially equal to that of said sleeve and connected to said bore by a shoulder within said one of said end nozzles;

(c) inserting said sleeve into said instrumentation tube through said opening;

(d) centering said sleeve within said instrumentation tube by locally expanding said sleeve into contact with said instrumentation tube at a plurality of locations each in one of said intervals;

(e) introducing into said sleeve a cap having a radial end collar dimensioned for abutting connection against said sleeve, a deformable lateral skirt and a bottom wall formed with a coolant flow orifice of predetermined cross-sectional area; and (f) securing said sleeve within said one of said nozzles by simultaneously expanding radially said skirt and said sleeve against said shoulder.

2. A method according to claim 1, wherein during step (d) said sleeve is locally expanded at locations mutually separated by axial distances substantially equal to the distance between end grids of three successive ones of said grids.

3. A method according to claim 2, wherein said sleeve is expanded simultaneously in two radially opposite directions at each location.

4. A method according to claim 1, wherein, during step (c) said sleeve is introduced until an end flange of the sleeve is in abutting contact against a frustoconical chamfer in said one of said end nozzles.

5. A method according to claim 4, wherein a radial abutting surface is formed onto an end surface of said one of said nozzles which is axially opposed to said bore during step (b) for receiving the end collar of the cap.

6. A method according to claim 1, wherein said sleeve is expanded in directions which are directed diagonally between fuel rods of said fuel assembly.

7. A method according to claim 1, wherein said sleeve is centered into the other one of said nozzles by radially expanding said sleeve.

* * * * *